United States Patent [19]

Kosuge et al.

[11] 4,364,354

[45] Dec. 21, 1982

[54] AIR-FUEL RATIO CONTROLLER FOR CARBURETOR

[75] Inventors: Tokuo Kosuge; Takeshi Atago; Kimiji Karino, all of Katsuta, Japan

[73] Assignee: Hitachi, Ltd., Tokyo, Japan

[21] Appl. No.: 215,847

[22] Filed: Dec. 12, 1980

[30] Foreign Application Priority Data

Dec. 28, 1979 [JP] Japan ................................ 54-170863

[51] Int. Cl.[3] ...................... F02B 33/00; G05B 15/02; F02M 7/06

[52] U.S. Cl. .................................. 123/437; 123/438; 261/39 D

[58] Field of Search ............... 123/437, 438, 440, 480, 123/491, 493, 179 G, 340, 341, 390, 399; 261/39 D

[56] References Cited

U.S. PATENT DOCUMENTS

| | | | |
|---|---|---|---|
| 1,861,725 | 6/1932 | Stokes | 261/39 D |
| 2,577,435 | 12/1951 | Siebenthaler | 123/438 |
| 3,960,118 | 6/1976 | Konomi et al. | 261/390 |
| 4,057,042 | 11/1977 | Aono | 123/440 |
| 4,088,100 | 5/1978 | Tokura et al. | 123/440 |
| 4,132,199 | 1/1979 | Kuroiwa et al. | 123/440 |
| 4,144,861 | 3/1979 | Yamashita et al. | 123/179 H |
| 4,216,175 | 8/1980 | Schauer | 261/39 D |
| 4,310,888 | 1/1982 | Furabashi et al. | 123/491 |

*Primary Examiner*—Raymond A. Nelli
*Attorney, Agent, or Firm*—Antonelli, Terry and Wands

[57] ABSTRACT

An air-fuel ratio controller for carburetors in which an auxiliary fuel system opening to the downstream side of a throttle valve of a carburetor is provided separately from the main and slow fuel systems of the carburetor. The air-fuel ratio of the mixture flowing through this auxiliary fuel system is controlled by a solenoid valve adapted to operate in accordance with either one or both of a parameter representing the warming up after cold start and a parameter representing deceleration of the engine.

10 Claims, 6 Drawing Figures

AIR-FUEL RATIO CONTROLLER FOR CARBURETOR

BACKGROUND OF THE INVENTION

1. Field of the Invention

The present invention relates to an air-fuel ratio controller for carburetors and, more particularly, to an air-fuel ratio controller for carburetors, incorporating an electronic controlling means capable of optimizing the air-fuel ratio of the air-fuel mixture supplied from the carburetor to an internal combustion engine in either one or both of warming up after cold start and deceleration of the engine.

2. Description of the Prior Art

In the conventional carburetors, the control of air-fuel ratio supplied to the engine during warming up after a cold start of the engine has been made by a heat sensitive member such as a bimetal operatively connected to the choke valve of the carburetor.

This controlling system, however, cannot provide a sufficiently high precision of the air-fuel ratio control, because the controlling operation is made fully mechanically. In addition, the construction of the carburetor is complicated to cause various troubles.

Also, in the conventional carburetors, a vacuum-sensitive valve generally referred to as "coasting richer" is used for controlling the air-fuel ratio of the mixture during deceleration of the engine through controlling the degree of opening of the fuel passage opening to the downstream side of throttle valve of the carburetor.

This system also fails to provide a sufficiently high precision of air-fuel ratio control because it fully relies upon mechanical operation.

SUMMARY OF THE INVENTION

Object of the Invention

It is, therefore, a major object of the invention to provide an air-fuel ratio controller for carburetors, capable of making more precise and optimum control of the air-fuel ratio of the mixture supplied from the carburetor to the engine, in either one or both of two operation modes: namely, the warming up after a cold start and deceleration.

BRIEF SUMMARY OF THE INVENTION

To this end, according to the invention, there is provided an air-fuel ratio controller having the following features. The air-fuel ratio controller of the invention comprises an auxiliary fuel system provided in a carburetor besides the main and slow fuel systems which are originally provided in the carburetor. The auxiliary fuel system opens to the downstream side of the throttle valve of the carburetor. The mixture supplied through this auxiliary fuel system is successively made lean in accordance with the progress of each or both of the warming up and deceleration operations, by means of a control valve adapted to operate in accordance with either one or both of the parameter representing the state of the warming up after cold start and the parameter representing the state of deceleration.

BRIEF DESCRIPTION OF THE DRAWINGS

FIGS. 2, 3 and 4 are characteristic charts showing the effects produced by the embodiment shown in FIG. 1 in which:

FIG. 2 shows the duty and air-fuel ratio in relation to the cooling water temperature;

FIG. 3 shows the duty and air-fuel ratio in relation to the running speed of automobile; and FIG. 4 shows the duty and air-fuel ratio in relation to the intake vacuum;

DESCRIPTION OF THE PREFERRED EMBODIMENT

A preferred embodiment will be described hereinunder, but not exclusively, in conjunction with the accompanyng drawings.

Figure 1:
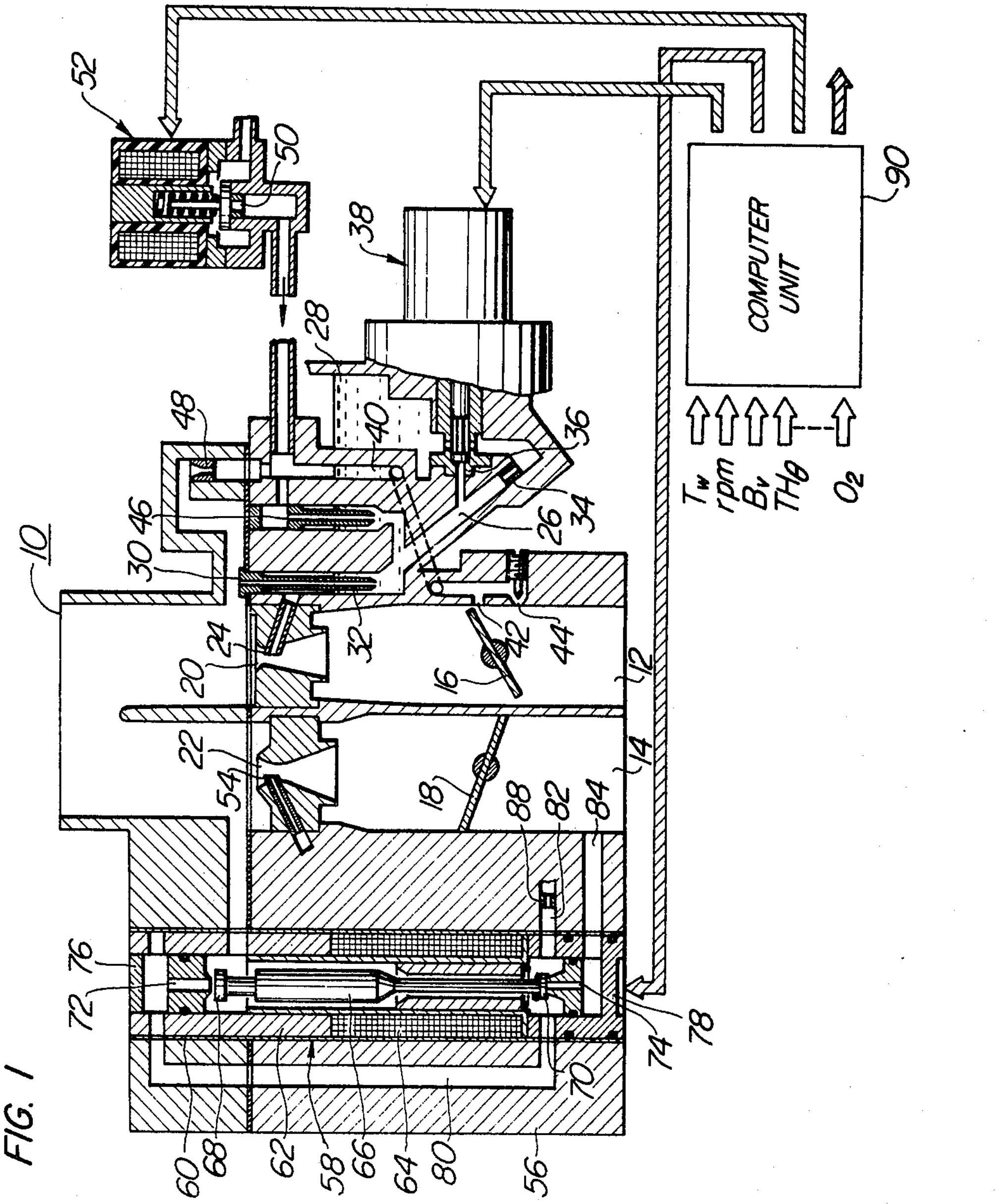
FIG. 1 is a sectional view of an air-fuel ratio controller constructed in accordance with an embodiment of the invention.

Referring first to FIG. 1, a reference numeral 10 denotes a carburetor to which the air-fuel controller of the invention is applied. The carburetor 10 has a primary intake passage 12 and a secondary intake passage 14. It is to be noted that this carburetor is of the type which has no choke valve at all. A primary throttle valve 16 and a secondary throttle valve 18 are disposed in the primary and secondary passages 12, 14, respectively. At the same time, a primary venturi 20 and a secondary venturi 22 are formed at the upstream sides of respective throttle valves 16, 18. A primary nozzle 24 opens to the primary venturi 20. This nozzle 24 is communicated with a float chamber 28 through a main fuel passage 26 of primary side. The primary main fuel passage 26 incorporates a primary main air bleed 30, emulsion tube 32 and a primary main jet 34 which are known per se. An auxiliary main jet 36 extends in parallel with the primary main jet 34 so as to communicate the float chamber 28 with the primary main fuel passage 26. This auxiliary main jet 36 is adapted to be opened and closed by means of an ON-OFF type solenoid valve 38.

A primary slow fuel passage 40, shunting from the primary main fuel passage 26 at an intermediate portion of the latter, is in communication with a bypass hole 42 opening near the primary throttle valve 16 and also with an idle hole 44. The primary slow fuel passage 40 is provided with a primary slow fuel jet 46 and a primary slow air bleed 48.

An auxiliary slow air bleed 50 extending in parallel with the primary slow air bleed 48 provides a communication between atmosphere and the primary slow fuel passage 40. The auxiliary slow air bleed 50 is adapted to be opened and closed by means of an ON-OFF type solenoid valve 52.

On the other hand, a secondary venturi 22 formed in the secondary intake passage 14 adjacent to the primary intake passage 12 has a secondary nozzle 54 opening thereto. The nozzle 54 communicates with the float chamber 28 through a secondary main fuel passage which is not shown. Needless to say, the secondary intake passage 14 is provided with known secondary slow fuel passage.

The solenoid valves corresponding to the ON-OFF type solenoid valves 38, 52 of the primary main and slow fuel passages 26, 40 are intentionally omitted from the main and slow fuel passages of the secondary intake passage 14. This is because the supply of fuel through the secondary intake passage 14 is required in the region of operation needing much power, the region inherently necessitates no control of air-fuel ratio. The another reason is that, if solenoid valves similar to the ON-OFF type solenoid valves 38, 52 of the primary intake passage 12 are provided in the secondary intake passage 14, it is difficult to position the later-mentioned solenoid valve for controlling the auxiliary fuel system.

Hereinafter, an explanation will be made as to the construction of the auxiliary fuel system constituting a characteristic feature of the invention.

A tubular ON-OFF type solenoid valve 58 is disposed on the wall 56 of the carburetor defining the secondary intake passage 14. This solenoid valve 58 is constituted by a tubular housing 60 accomodating a core 62, coil 64 and a movable plunger 66. An air control valve 68 and a fuel control valve 70 are formed at both ends of the movable plunger 66. Also, an air valve seat 72 cooperating with the air control valve 68 and a fuel valve seat 74 for cooperating with the fuel control valve 70 are formed substantially coaxially with each other in the tubular housing 60. The tubular housing 60 is closed at its both ends by closure members 76, 78. Thus, all parts of metering section constituting the auxiliary fuel system are housed by the tubular housing 60. This assembly is formed separately from the carburetor and attached to the carburetor thereafter.

Air is introduced from the upstream side of the secondary venturi 22 to the side of the air valve seat 72 adjacent to the air control valve 68. After a metering by the cooperation of the air control valve 68 and the associated valve seat 72, this air is introduced through the auxiliarly air passage 80 toward the fuel control valve 70, i.e. to the upstream side of the fuel valve seat 74. On the other hand, fuel is introduced to the same side of the fuel valve seat 74 as the fuel control valve 70, from the float chamber 28 via the auxiliary fuel passage 82. These air and fuel are supplied to the auxiliary mixture passage 84 through the fuel valve seat 74 and finally reaches the downstream side of the throttle valve 18 of the secondary intake passage 14. The auxiliary fuel passage 82 is provided therein with an auxiliary fuel jet 88 adapted to limit the maximum flow rate of the fuel flowing through the auxiliary fuel passage 82.

A description will be made here as to the signals delivered to respective solenoid valves 38, 52 and 58.

These solenoid valves 38, 52 and 58 receive opening and closing signals from a computer unit 90 which is of a digital type constituted mainly by a microcomputer and adapted to produce a duty control type output. The computer unit 90 receives parameters representative of state of warming up of the engine after a cold start such as cooling water temperature signal Tw, engine speed signal rpm and the like, as well as a parameter representing the state of deceleration of the engine such as intake vacuum signal Bv, engine speed signal rpm, throttle opening degree signal $TH_\theta$ and a parameter representing the coasting or cruising state of the engine such as air-fuel ratio signal $O_2$ representing the air-fuel ratio of the mixture supplied to the engine. These signals are detected in a manner as shown in the following table 1.

TABLE 1

| detection element | position of detection | detecting means |
|---|---|---|
| cooling water temperature signal Tw | cooling water jacket of engine | temperature sensor |
| engine speed signal rpm | engine crank shaft | crank angle sensor |
| intake vacuum Bv | downstream side of throttle valve in primary passage | semiconductor pressure sensor |
| throttle valve opening degree signal $TH_\theta$ | throttle valve of primary intake passage | microswitch (idle opening sensor) |
| air-fuel ratio signal $O_2$ | exhaust pipe | oxygen concentration sensor |

Upon receipt of the input signals shown in table 1 above, the computer unit 90 produces control output signals as shown in Table 2 below.

TABLE 2

| state of operation | manner of control |
|---|---|
| warming up after cold start | A signal corresponding to the present state of operation is derived from the memory incorporated in the computer unit 90, and is delivered to the solenoid valve 58. |
| normal running (cruising) | Air-fuel ratio signal $O_2$ from oxygen concentration sensor is compared with reference signal and a signal is produced to converge the air-fuel ratio to the stoichiometric one. This signal is delivered to solenoid valves 38, 52. |
| deceleration | A signal corresponding to the present state of operation is derived from the memory incorporated in the computer unit 90, and is delivered to the solenoid valve 58. |

Hereinafter, a description will be made as to how the solenoid valves 38, 52 and 58 operate in accordance with various states of engine operation.

[Warming up after cold start]

In starting up and warming up an engine, it is necessary that the air-fuel ratio of the mixture supplied to the engine be controlled in such a manner that the mixture is specifically rich at the time of start up and becomes leaner generally till the warming up is completed after the start up. In this case, the cooling water temperature signal Tw and the engine speed signal rpm are produced by the cooling water temperature sensor and the crank angle sensor, and are delivered to the computer unit 90 as input signals.

When both signals in combination express the state of starting up of the engine, the computer unit 90 does not send control signals to the solenoid valves 38, 52 but only to the solenoid valve 58. This control signal is read out from a memory incorporated in the computer unit 90, e.g. an ROM (Read Only Memory). This memory memorizes the air-fuel ratios determined by various cooling water temperature signals Tw and the engine speed signal rpm. More specifically, the value of the air-fuel ratio stored in the memory is small, i.e. the mixture is rich, for lower cooling water temperature and lower engine speed. Therefore, the time ratio between the time length in which the movable plunger 66 of the solenoid valve 58 takes the upper position to the unit time is greater at the time of start up of the engine than in other mode of engine operation. Namely, the signal delivered to the solenoid valve 58 takes the form of rectangular pulses under a duty control. The duty ratio, i.e. the time length of electric current supply to the whole time length in each cycle, is great at the time of start up of the engine. In consequence, in the solenoid valve 58, the air valve seat 72 is closed by the air control valve 68 while the fuel valve seat 74 is opened by the fuel control valve 70, so that fuel is supplied to the auxiliary mixture passage 84 through the auxiliary fuel passage 88.

Then, as the engine temperature is raised and engine speed is increased, the computer unit 90 reads out the value corresponding to the state of the increased engine temperature and speed, from the memory incorporated therein, and this signal is also delivered to the solenoid valve 58. The duty ratio of this signal, i.e. the ratio of time length of current supply to the whole time length in each cycle, is smaller than that of the first signal delivered at the time of start up, so that the rate of air supply through the air valve seat 72 is increased correspondingly to make the mixture flowing in the auxiliary mixture passage 84 leaner.

Thus, the mixture following through the auxiliary mixture passage 84 gradually becomes leaner as the warming of the engine proceeds, till the warming up is completed. At the time of completion of the warming up, the solenoid valve 58 is completely de-energized because the duty ratio of the signal becomes 0%, so that the fuel valve seat 74 is closed by the fuel control valve 70. The supply of the air-fuel mixture through the auxiliary mixture passage 84, therefore, is ceased at this state.

Figure 2:
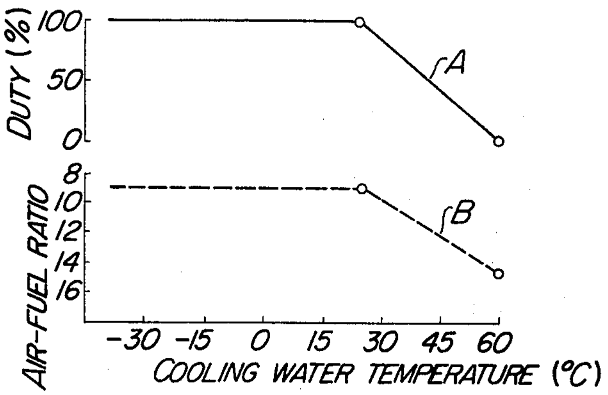

This operation will be more fully understood from the following explanation taken in conjunction with FIG. 2. In FIG. 2, a full-line curve A represents the duty of the control signal delivered to the solenoid valve 58, while a broken-line curve B represents the air-fuel ratio of the mixture supplied from the carburetor 10. When the cooling water temperature is lower than 25° C., it is necessary to maintain a rich mixture. In this state, the duty of the signal applied to the solenoid valve 58 is 100%, and the plunger 66 of the solenoid valve 58 is positioned at the upper position so that the auxiliary fuel passage 82 supplies only the fuel. As the cooling water temperature is increased beyond 25° C., the duty of the signal imposed on the solenoid valve 58 is decreased gradually and is lowered to 0% as the cooling water temperature is raised to 60° C. Namely, the duty ratio is gradually lowered proportionally to the rise of temperature within the temperature range of between 25° C. and 60° C. When the cooling water temperature is raised to 60° C., the solenoid valve 58 closes the fuel valve seat 74 to stop the supply of auxiliary mixture through the fuel valve seat 74. Therefore, the air-fuel ratio of the mixture supplied from the carburetor 10 is changed in accordance with this change of duty ratio.

[Normal running (cruising)]

During normal running of the automobile, it is necessary to control and maintain the air-fuel ratio at a level approximating the stoichiometric air-fuel ratio. In this case, the concentration of oxygen in the exhaust system is detected by means of the oxygen sensor so that the signal $O_2$ is delivered to the computer unit 90. Then, the computer unit 90 stops the delivery of the signal to the solenoid valve 58, and starts to send control signals to the solenoid valves 38, 52. These control signals are rectangular pulse signal produced through a comparison of the signal $O_2$ transmitted from the oxygen concentration sensor with a reference signal representing the stoichiometric sensor, and takes the form of duty control signal. Therefore, if the mixture supplied from the carburetor 10 is richer than the stoichiometric one, the time length of electric power supply to the solenoid valve 38 is shortened to increase the time length of closing of the auxiliary main fuel jet 36 by the solenoid valve 38. The solenoid valve 52 receives a signal which is obtained by inverting by an inverter signal delivered to the solenoid valve 38, so that the solenoid valve 52 is allowed to open the auxiliary slow air bleed 50 for longer time. Consequently, the fuel supplied through the primary main and slow fuel passages 26, 40 is decreased to make the actual air-fuel ratio approach the stoichiometric one. To the contrary, when the mixture supplied from the carburetor is leaner than the stoichiometric one, the operation proceeds in a contrary way to make the air-fuel ratio approach the stoichiometric one.

Figure 3:
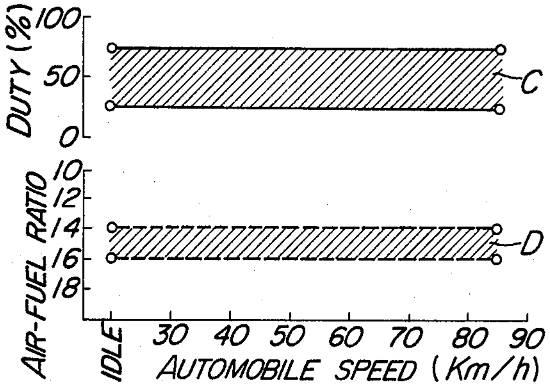

This operation will be more fully realized from the following description taken in conjunction with FIG. 3. In FIG. 3, the region C shown by full line represents the duty of the signal delivered to the solenoid valve 38, while the region D shown by the broken line represents the air-fuel ratio of the mixture supplied from the carburetor.

As stated before, the signal delivered to the solenoid valve 52 is obtained by inverting the signal applied to the solenoid valve 38. The solenoid valve 38 is controlled, within the region D, at a duty ratio of between, for example, 30 and 70%, in accordance with the deviation of the signal from the oxygen sensor and the reference signal. In consequence, the air-fuel ratio is controlled to converge round the predetermined air-fuel ratio of between, for example, 14 and 16, as shown in the region D.

[Deceleration]

When the engine is decelerated, an abrupt increase of vacuum is generated at the downstream side of each throttle valve 16, 18 of the carburetor 10, so that the combustion in the combustion chamber of the engine is rendered unstable to inconveniently increase the unburnt combustible content in the exhaust gas. Therefore, at the beginning period of the deceleration, it is necessary to stabilize the combustion by supplying richer mixture. It is also necessary that the mixture is gradually made leaner as the deceleration proceeds. In this case, therefore, the computer unit 90 receives the engine speed signal rpm from the engine speed sensor, throttle valve opening degree signal $TH_\theta$ from the microswitch and the intake vacuum signal Bv from the vacuum sensor. When the vacuum signal Bv, throttle valve opening degree signal $TH_\theta$ and the engine speed signal rpm in combination represent the decelerating state of the engine, the computer unit 90 stops to deliver the control signal to the solenoid valves 38, 52 but delivers the signal only to the solenoid valve 58. The signal delivered to the solenoid valve 58 is read out from a memory such as a ROM (Read Only Memory) incorporated in the computer unit 90. This memory stores air-fuel ratios for various engine speed signals rpm and various vacuum signals Bv. More specifically, the value of the air-fuel ratio read out from the memory is smaller, i.e. the mixture is richer as the engine speed is higher and the intake vacuum is greater (approach the absolute vacuum).

Therefore, the ratio of the time length in which the plunger 66 of the solenoid valve 58 takes the upper position shown in FIG. 1 to the whole time length of each cycle is great at the beginning period of the deceleration. Namely, in the beginning period of deceleration, the ratio of time length of current supply to the solenoid valve to the whole time length of each cycle is long, so that the solenoid valve 58 operates to close the air valve seat 72 by the air control valve 68 and to open the fuel valve seat 74 by means of the fuel control valve 70, so that fuel is supplied to the auxiliary mixture passage 84 through the auxiliary fuel passage 88.

Then, as the deceleration proceeds, the engine speed is decreased gradually and the intake vacuum is lowered (approaches the atmospheric pressure), the computer unit 90 reads out the value of air-fuel ratio corresponding to this state of lowered engine speed and intake vacuum, and this signal is delivered to the solenoid valve 58 as the control signal. The duty ratio of this signal is smaller than that of the signal delivered at the beginning period of the deceleration, so that the flow rate of air flowing through the air valve seat 72 is increased correspondingly to make lean the mixture flowing through the auxiliary mixture passage 84. Thus, the mixture flowing through the auxiliary mixture passage 84 is gradually made lean in accordance with the progress of the deceleration till the deceleration is ended.

After the ending of the deceleration, the current supply to the solenoid valve 58 is interrupted or the duty ratio of the signal applied to the solenoid valve 58 is reduced to 0%, so that the fuel valve seat 74 is closed by the fuel control valve 70 and, accordingly, no mixture is supplied through the auxiliary mixture passage 84.

Figure 4:
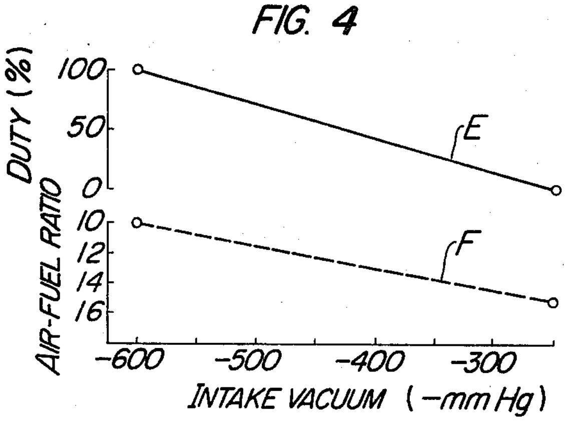

This operation will be explained in connection with FIG. 4. The full-line E represents the duty of the control signal supplied to the solenoid valve 58, while the broken line F represents the air-fuel ratio of the mixture supplied from the carburetor 10. During the deceleration, the duty ratio of the signal supplied to the solenoid valve 58 is 100% when the intake vacuum takes a level of −600 mmHg, so that the plunger 66 of the solenoid valve 58 takes the upper position to permit the auxiliary fuel passage 82 to supply only the fuel. The duty ratio is gradually reduced as the level of the intake vacuum is lowered and finally comes down to 0% when the intake vacuum is lowered down to −250 mmHg. Thus, the duty ratio is reduced proportionally to the change of the intake vacuum within the region between −600 mmHg and −250 mmHg. When the intake vacuum is lowered to −250 mmHg, the solenoid valve 58 acts to close the fuel valve seat 74 to stop the supply of the auxiliary mixture. In consequence, the air-fuel ratio of the mixture from the carburetor 10 is changed in accordance with the change in the duty ratio.

As has been described, according to the invention, the air-fuel ratio of the mixture flowing in the auxiliary mixture passage 84 is changed, in either one or both of warming up after cold start and deceleration, in accordance with the parameters representing respective states of the engine, so that the supply of air-fuel mixture is optimized.

The invention offers also the following advantages, thanks to the auxiliary air passage 80 and the auxiliary fuel passage 82 opening to the upstream side of the fuel valve seat.

Figure 5:
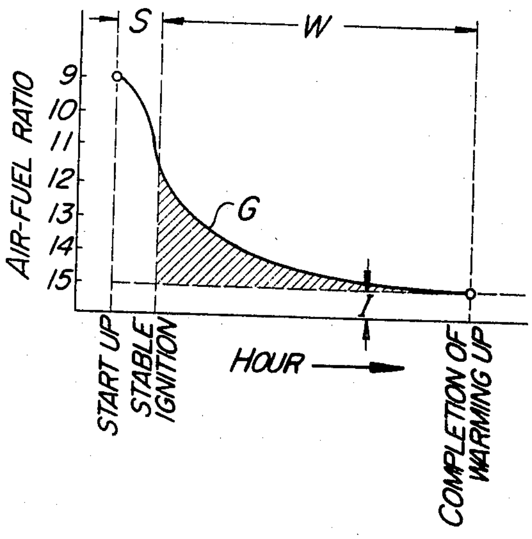
FIG. 5 is a chart showing the air-fuel ratio demand characteristic over the operation period from start up to the completion of warming up.

Generally, the air-fuel ratio is required to be changed along a characteristic shown by a full-line curve G of FIG. 5, in the period of between start up till completion of warming up of the engine. More specifically, in the beginning period S from the start up to the stable ignition, the rate of fuel supply is increased, and, after the stable ignition, the rate of fuel supply is reduced to a half. Thereafter, the rate of supply of fuel is gradually decreased in the final period W till the completion of warming up. The symbol I represents the fuel supplied through the idle port 44.

From FIG. 5, it will be understood that a minute and delicate control of fuel is necessary in the period W from the safe ignition till the end of the warming up. To this end, according to the invention, the auxiliary air passage 80 and the auxiliary fuel passage 82 are made to open at the upstream side of the fuel valve seat 74.

Figure 6:
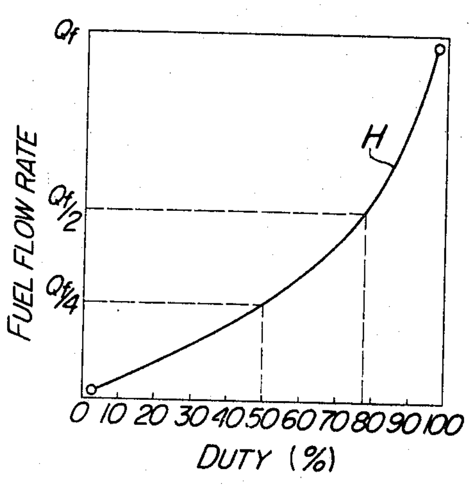
FIG. 6 shows the relationship between the duty of a solenoid valve disposed in an auxiliary fuel system shown in FIG. 1 and the flow rate of the fuel.

Namely, since the auxiliary air passage 80 opens to the upstream side of the fuel valve seat 74, it serves to effect a certain control of the vacuum generated at the downstream side of the throttle valve 18 and imposed upon the auxiliary fuel passage 82. As will be seen from FIG. 6, the air control valve 68 closes the associated air valve seat 72 in the solenoid valve 58 when the duty ratio of the control signal is 100%, so that the vacuum generated at the downstream side of the throttle valve 18 is imposed on the auxiliary fuel passage 82 directly through the fuel valve seat 74 to permit the fuel Qf to be supplied to the engine. Then, as the duty ratio of the control signal is decreased gradually, the plunger 66 of the solenoid valve 58 vibrates up and down in accordance with the duty ratio to correspondingly increase the flow rate of air flowing through the air valve seat 74 to control the vacuum imposed on the auxiliary fuel passage 82. Thus, the flow rate of fuel supplied from the auxiliary fuel passage 82 is changed following the curve H of FIG. 6, in accordance with the change of the duty ratio. Since the duty ratio is 100% at the time of start up of the engine, the fuel is supplied at the flow rate Qf. Then, as the stable ignition is completed, the fuel flow rate is reduced to Qf/2. The duty ratio in this state is about 78%, and as fuel flow rate is reduced to Qf/4, the duty ratio is about 50%. Thus, in the period W after the stable ignition till the end of the warming up, the control of fuel is performed with the duty ratio varying between 78% and 0%. It will be seen that a minute and delicate fuel control is achieved thanks to a comparatively wide range of duty ratio over which the fuel control is performed.

This advantageous effect is produced, needless to say, also in the decelerating operation of the engine.

As has been described, according to the invention, an auxiliary fuel system opening to the downstream side of the throttle valve of a carburetor is provided besides the main fuel system and slow fuel system of the carburetor, and the air-fuel ratio of the mixture flowing this auxiliary fuel passage is controlled by a solenoid valve which operates in accordance with either one or both of the parameter representing the state of warming up after cold start and deceleration of the engine. In consequence, the air-fuel ratio of the mixture supplied from the carburetor to the engine is optimized in either one or both of operation modes of warming up after cold start and deceleration.

What is claimed is:

1. In a carburetor of the type having a primary intake passage which operates during normal running of said engine and a secondary intake passage which operates at high-speed operation of said engine, having a main fuel system for supplying a fuel from a float chamber into a venturi formed upstream of a throttle valve rotatably disposed in the primary intake passage, a main fuel control valve disposed in said main fuel system for controlling the flow rate of fuel flowing through said main fuel system so as to converge to a target air-fuel ratio based on a normal running parameter representing a normal running condition of an internal combustion engine, a slow fuel system for supplying the fuel from said float chamber into a portion of the primary intake passage adjacent to said throttle valve, and a slow fuel control valve disposed in said slow fuel system for controlling the flow rate of fuel flowing through said slow fuel system so as to converge to said target air-fuel ratio based on said normal running parameter, an air-fuel mixture being formed by the fuel from both of said main and slow fuel systems and air flowing through said intake passage;

an air-fuel ratio controller comprising:

(a) an auxiliary fuel passage communicating said float chamber and a portion of said secondary intake passage downstream of said throttle valve with each other;

(b) an auxiliary air passage supplying air into said auxiliary fuel passage;

(c) an auxiliary fuel control valve for controlling the flow rate of fuel flowing through said auxiliary fuel passage;

(d) an auxiliary air control valve for controlling the flow rate of air passing through said auxiliary air passage; and (e) an electromagnetic actuator operated by duty-controlled ON-OFF pulses based on at least one of a starting-up/warming-up parameter representing a starting-up/warming-up running condition of the internal combustion engine and a deceleration parameter representing a decelerating running condition of the engine, for controlling said auxiliary fuel control valve and said auxiliary air control valve so as to gradually decrease the flow rate of fuel flowing through said auxiliary fuel passage and gradually increase the flow rate of air flowing through said auxiliary air passage as said at least one running condition proceeds, and to deactivate said actuator for halting or suspending the supply of the fuel and the air from said auxiliary fuel passage and said auxiliary air passage when said at least one parameter indicates that said running condition is completed.

2. An air-fuel ratio controller for carburetors as claimed in claim 1, wherein said auxiliary air passage is connected at an intermediate portion of said auxiliary fuel passage.

3. An air-fuel ratio controller for carburetors as claimed in claim 2, wherein said auxiliary air passage is provided with an air valve seat adapted to be opened and closed by said air control valve, while said auxiliary fuel passage is provided with a fuel valve seat adapted to be opened and closed by said auxiliary fuel control valve, and said auxiliary air passage is connected to said auxiliary fuel passage at a portion of the latter upstream from said fuel valve seat.

4. An air-fuel ratio controller for carburetors as claimed in claim 1, wherein said normal running parameter includes an air-fuel ratio signal derived from an oxygen sensor disposed in the exhaust system of said internal combustion engine, said warming-up parameter includes a cooling water temperature signal derived from a temperature sensor provided in a cooling water jacket of said internal combustion engine and an engine speed signal derived from a rotation speed sensor provided on the crank shaft of said internal combustion engine, and said deceleration parameter includes said engine speed signal, a throttle valve opening degree signal drived from a valve opening sensor associated with said throttle valve and an intake vacuum signal derived from a vacuum sensor provided in said intake passage.

5. An air-fuel controller according to claim 1, wherein said duty-controlled ON-OFF pulses, by which the electromagnetic actuator is operated, are based on both of said starting-up/warming-up and deceleration parameters.

6. An air-fuel ratio controller for carburetors as claimed in claim 1, wherein said air control valve is attached to one end of said movable plunger constituting a part of said electromagnetic actuator while said fuel control valve is attached to the other end of said movable plunger.

7. An air-fuel ratio controller for carburetors as claimed in claim 6, wherein said air valve seat, air control valve, movable plunger, fuel control valve and said fuel valve seat are arranged substantially coaxially.

8. An air-fuel ratio controller for carburetors as claimed in claim 7, wherein said air valve seat, air control valve, movable plunger, said coil for driving said movable plunger, fuel control valve and said fuel valve seat are accomodated by a tubular housing.

9. An air-fuel ratio controller for carburetors as claimed in claim 8, wherein said tubular housing is disposed at a side of said secondary intake passage.

10. An air-fuel controller according to claim 9, wherein said housing and elements accommodated thereby are a separate assembly attached to the carburetor.

* * * * *